US012692739B2

(12) United States Patent
Six

(10) Patent No.: US 12,692,739 B2
(45) Date of Patent: Jul. 28, 2026

(54) DASHPOT FOR DAMPING A CLOSING MOVEMENT OF A HINGED CLOSURE MEMBER

(71) Applicant: LOCINOX, Waregem (BE)

(72) Inventor: Ivo Six, Zwevegem (BE)

(73) Assignee: LOCINOX, Waregem (BE)

( * ) Notice: Subject to any disclaimer, the term of this patent is extended or adjusted under 35 U.S.C. 154(b) by 7 days.

(21) Appl. No.: 18/748,755

(22) Filed: Jun. 20, 2024

(65) Prior Publication Data

US 2024/0426155 A1 Dec. 26, 2024

(30) Foreign Application Priority Data

Jun. 21, 2023 (EP) .................................... 23180661

(51) Int. Cl.
*E05F 3/04* (2006.01)
*E05F 3/10* (2006.01)

(52) U.S. Cl.
CPC ..................................... *E05F 3/10* (2013.01)

(58) Field of Classification Search
CPC . E05F 1/066; E05F 1/1008; E05F 1/12; E05F 1/1207; E05F 1/1223; E05F 3/00; E05F 3/04; E05F 3/08; E05F 3/10; E05F 3/12; E05F 3/20; E05F 5/00; E05D 3/02; E05D 11/02; E05D 11/04; E05D 11/084; E05D 11/1014; E05D 7/12; E05D 2005/108; E05Y 2800/00; E05Y 2201/21; E05Y 2201/264; E05Y 2201/408; E05Y 2201/456; E05Y 2201/696; E05Y 2201/628; E05Y 2201/638; E05Y 2201/256; E05Y 2900/40; E05Y 2900/132
See application file for complete search history.

(56) References Cited

U.S. PATENT DOCUMENTS 4,148,111 A * 4/1979 Lieberman ................ E05F 3/12
16/84
4,573,238 A * 3/1986 Phillips .................. E05F 3/102
137/513.5

(Continued)

FOREIGN PATENT DOCUMENTS

EP 2546442 A1 * 1/2013 ................ E05F 3/20
EP 3907417 A1 * 11/2021 ................ F16F 9/19

(Continued)

*Primary Examiner* — Chuck Y Mah
(74) *Attorney, Agent, or Firm* — FisherBroyles, LLP; Roger L. Browdy; James E. Mrose

(57) ABSTRACT

A dashpot comprising a housing; a closed cylinder cavity filled with hydraulic fluid; a slideable piston within the housing and dividing the closed cylinder cavity into a high pressure compartment and a low pressure compartment; a one-way fluid passage allowing fluid flow from the low pressure compartment to the high pressure compartment when the dashpot is being opened; a first restricted fluid passage determining a closing speed of the dashpot; and a mechanism for compensating temperature-induced viscosity changes of the hydraulic fluid. The compensation mechanism comprises: a second restricted fluid passage and a needle valve comprising: an elongated body whose a length is temperature dependent. The tip of the needle valve has a shape so that fluid flow along the second restricted fluid passage is always possible.

19 Claims, 7 Drawing Sheets

(56) References Cited

U.S. PATENT DOCUMENTS

| | | | | | |
|---|---|---|---|---|---|
| 5,727,776 | A * | 3/1998 | Gerstenberger | F16K 1/38 | 251/332 |
| 6,112,368 | A * | 9/2000 | Luckett | E05F 3/12 | 16/49 |
| 6,205,619 | B1 * | 3/2001 | Jang | E05F 3/20 | 16/50 |
| 8,240,005 | B2 * | 8/2012 | Hufen | E05F 3/12 | 16/49 |
| 2004/0068833 | A1 * | 4/2004 | Sawa | E05F 3/20 | 16/60 |
| 2009/0241289 | A1 * | 10/2009 | Choi | E05F 3/20 | 16/303 |
| 2010/0319260 | A1 * | 12/2010 | Sawa | E05F 3/20 | 49/326 |
| 2011/0214354 | A1 | 9/2011 | Talpe | | |
| 2012/0227212 | A1 * | 9/2012 | Talpe | E05F 3/14 | 16/58 |
| 2012/0318384 | A1 * | 12/2012 | Sohn | E05F 3/12 | 137/468 |
| 2017/0241180 | A1 * | 8/2017 | Bacchetti | E05F 3/20 | |

FOREIGN PATENT DOCUMENTS

| | | | | |
|---|---|---|---|---|
| EP | 3907418 | A1 | 11/2021 | |
| WO | WO-9954583 | A2 * | 10/1999 | E05F 3/227 |
| WO | WO-0061903 | A1 * | 10/2000 | E05D 7/081 |
| WO | 2021170871 | A1 | 9/2021 | |

* cited by examiner

DASHPOT FOR DAMPING A CLOSING MOVEMENT OF A HINGED CLOSURE MEMBER

TECHNICAL FIELD

The present invention relates to a dashpot for damping a closing movement of a closure system having a support and a closure member that are hingedly connected to each other. The present invention further relates to a hydraulically damped actuator for damping a closing movement of a closure system comprising the dashpot.

BACKGROUND ART

A known dashpot comprises: a housing; a closed cylinder cavity formed within the housing and being filled with hydraulic fluid; a piston within said housing so as to divide the closed cylinder cavity into a high pressure compartment and a low pressure compartment, the piston being slideable with respect to the housing between two extreme positions in a sliding direction; a one-way fluid passage allowing fluid flow from the low pressure compartment to the high pressure compartment when said closure member is being opened; a restricted fluid passage connecting the high pressure compartment and the low pressure compartment and determining a closing speed of the closing movement of the closure system; and a compensation mechanism configured for compensating temperature-induced viscosity changes in said hydraulic fluid.

The dashpot may be included in a hinge or may be part of an actuator which comprises a spring for automatically closing the closure system after the closure member has been opened. The dashpot is in particular intended for outdoor use.

The compensation mechanism generally comprises a first part and a second part which cooperate with one another to form a restricted fluid passage having a variable narrowest cross sectional area. The first part is made of a first material having a first thermal expansion coefficient and the second part is made of a second material having a second thermal expansion coefficient, the second thermal expansion coefficient being larger than the first thermal expansion coefficient so that said narrowest cross sectional area is decreased when said temperature is raised and vice versa so that the narrowest cross sectional area is increased when said temperature is lowered. The viscosity of the hydraulic fluid changes with temperature with the viscosity becoming lower as the temperature is raised and vice versa. The change in area of the narrowest cross sectional area is thus opposing the change in viscosity of the hydraulic fluid so that the compensation system ensures a substantially constant closing speed within a certain range of temperatures.

A dashpot having the above described features is disclosed in EP 3 067 499 A1. This known dashpot is used in an actuator that is separately attached to the closure system. The dashpot has a cylinder barrel and a piston. A first restricted fluid passage connecting the high pressure compartment with the low pressure compartment is formed in the cylinder barrel. This first restricted fluid passage comprises an adjustable valve for adjusting the cross sectional area thereof, i.e. for adjusting the closing speed of the closure member. A second restricted fluid passage is formed between the piston and the cylinder barrel. The piston has a somewhat smaller outer diameter than the inner diameter of the cylinder barrel so that there is a clearance between the piston and the cylinder barrel. This clearance forms a second restricted fluid passage between the high pressure compartment and the low pressure compartment of the cylinder cavity. The cylinder barrel is made of aluminium and the piston is made of polyoxymethylene which has a higher thermal expansion coefficient than aluminium. The difference in thermal expansion causes the cross sectional area of the clearance between the piston and the cylinder barrel (i.e. the narrowest cross sectional area of the second restricted fluid passage) to decrease with increasing temperature and vice versa. This automatic temperature variation of the clearance between the piston and the cylinder barrel compensates for the viscosity changes in the hydraulic fluid, while not affecting hydraulic fluid flow through the first restricted fluid passage that is used to manually adjust the closing speed of the dashpot.

Polyoxymethylene was found to be the most appropriate polymeric material for the piston. It has a high strength, hardness and rigidity and is therefore widely used for producing injection-moulded high-performance engineering components such as small gear wheels, etc. In the dashpot disclosed in EP 3 067 499 A1, the use of polyoxymethylene has however the disadvantage that its thermal expansion coefficient is so high that, as from a temperature of between 3° and 45° C., there is no longer a clearance between the piston and the cylinder barrel so that, as from a certain temperature, the piston may get stuck in the cylinder barrel. This is a particular problem for outdoor applications where the temperature of the dashpot may vary within wider limits, in particular within a range of from below −30° C. to up to and even exceeding 70° C. The difference between the thermal expansion coefficients of aluminium (and other metals) and polyoxymethylene (and most other polymeric materials including polyamide) is so large that an appropriate viscosity-temperature compensation cannot be achieved over this whole range, which range spans about 100° C.

This problem has already been addressed in EP 3 907 417 A1 where it was disclosed to solve this problem by revising the material composition of the piston. More specifically, the piston disclosed in EP 3 907 417 A1 comprises a base and an outer cover layer, the base being made of a glass fibre reinforced polymeric material and the outer cover layer being made of a polymeric material which is less abrasive towards the metal of the cylinder than the glass fibre reinforced polymeric material. The glass fibres in the polymeric material results in a linear thermal expansion coefficient which is much smaller than the thermal expansion coefficient of the polymeric material without the glass fibres which allows to achieve the temperature compensation over the required temperature range, in particular over a temperature range of −30° C. to 70° C. The outer cover layer avoids damaging the cylinder barrel which would occur in case the entire piston is made of glass-fibre reinforced polymeric material.

However, such a multi-material piston complicates manufacturing and increases the overall cost of the piston. Furthermore, the manufacturing tolerance of the polymeric piston is relatively high so that the cross-sectional area of the clearance between the piston and the cylinder barrel is subject to high manufacturing tolerances. This may lead that the clearance is higher in one dashpot compared to another dashpot which makes it challenging to obtain the desired stable dashpot operation over the large temperature range.

The problem of dashpot application over a wide temperature range has also been addressed in the dashpots disclosed in WO 2021/170871 A1 and EP 3 907 418 A1. These known dashpots are used in an actuator that is formed in a hinge that connects the closure member to the support. The dashpot has a cylinder barrel, a piston, and a damper shaft. A single restricted fluid passage connecting the high pressure compartment with the low pressure compartment is formed in the damper shaft and a valve seat is provided therein by a narrowing of the bore. An elongated needle valve is positioned along the length of the bore with a tip disposed in the valve seat with a clearance therebetween. The damper shaft is made of metal, such as stainless steel or aluminium, and the valve is made from polyethylene or polypropylene which has a higher thermal expansion coefficient than stainless steel (or most common metals). The difference in thermal expansion causes the cross sectional area of the clearance between the needle valve and the valve seat in the restricted fluid passage within the damper shaft to decrease with increasing temperature and vice versa. This automatic temperature variation of the clearance between the needle valve and the damper shaft compensates for the viscosity changes in the hydraulic fluid.

A downside of this known dashpot is that the needle valve is manually adjustable in order to adjust the closing speed of the dashpot, which speed is determined by the clearance in the restricted fluid passage. When a user closes the needle valve too much (i.e. desires a low closing speed), it may lead to situations, especially when the outdoor temperature is high, where the needle valve has expanded to such an amount so as to fully engage the valve seat in which situation there is no longer any clearance between the needle valve and the valve seat. A hydraulic fluid flow along the restricted fluid passage is therefore no longer possible and the closure member is stuck. The same can occur also in non-adjustable dashpots when unexpected high temperatures arise (e.g. exceeding 70° C.).

DISCLOSURE OF THE INVENTION

An object of the present invention is to provide an improved solution for having a dashpot with a compensation mechanism that is operative over a wider range of temperatures than the dashpot disclosed in EP 3 067 499.

To this end, the dashpot according to the present invention is characterised in that the compensation mechanism comprises: a second restricted fluid passage connecting the high pressure compartment and the low pressure compartment and having a narrowest cross-sectional area determined in a hypothetical plane with a normal direction; and a needle valve positioned at least partially inside the second restricted fluid passage and comprising: an elongated body extending between a first end fixed to the housing and a second end opposite the first end, wherein a length of the elongated body is temperature dependent; and a tip positioned at the second end of the elongated body near the narrowest cross-sectional area, wherein a projection of the tip onto said hypothetical plane along said normal direction forms a two-dimensional shape which does not fully cover said narrowest cross-sectional area.

The compensation mechanism according to the present invention is based on the known concept of a needle valve disposed in a restricted fluid passage with the difference in thermal expansion between the needle valve (i.e. the elongated body thereof) and the housing material (in which the second restricted fluid passage is formed) causing a variation of the clearance between the needle valve tip and the second restricted fluid passage, which variation compensates for temperature-induced viscosity changes of the hydraulic fluid.

The provision of a second restricted fluid passage in addition to the first restricted fluid passage (which determines the closing speed of the dashpot) avoids the problems that arise in the dashpots of WO 2021/170871 A1 and EP 3 907 418 A1 which both rely on a single restricted fluid passage. As such, even should the second restricted fluid passage be closed off due to unforeseen circumstances, fluid flow along the first restricted fluid passage remains possible. The dashpot thus cannot get stuck.

Furthermore, in the dashpot according to the present invention, a projection of the tip onto the hypothetical plane in which the narrowest cross-section of the second restricted fluid passage is determined along said normal direction forms a two-dimensional shape which does not fully cover said narrowest cross-sectional area. As such, the tip cannot fully cover the narrowest cross-sectional area irrespective of the temperature. It is therefore impossible for the second restricted fluid passage to become fully closed.

Moreover, the compensation mechanism does not require a multi-material piston as in EP 3 907 417 A1 so that the downsides, e.g. cost and design complexity, associated therewith are avoided.

There is also no need to rely on a clearance between the piston and the cylinder as in the dashpot of EP 3 067 499 A1 to act as a compensation mechanism. This clearance, as described above, is subject to large manufacturing tolerances, and thus unreliable over large temperature variations. Moreover, in case the housing is made of a polymeric material, the dimensional stability of the cylinder barrel is decreased when compared to a cylinder barrel made from a metal which again negatively impacts the reliability of the clearance between the piston as a compensation mechanism. Furthermore, in such a polymeric housing, an adequate material for the piston has to be found which has an extremely high thermal expansion coefficient. Such materials are not common and quite expensive and are moreover not necessarily suitable for an injection moulding process which is typically used to manufacture the piston.

In an embodiment according to the present invention the hydraulic fluid has a kinematic viscosity which is variable in a first temperature range and which is stable in a second temperature range (the second temperature range being non-overlapping with the first temperature range). Preferably, the first temperature range extends between a lower temperature value and a critical temperature value and the second temperature range extends between said critical temperature value and an upper temperature, said critical temperature being comprised between 0° C. and 40° C., in particular between 5° C. and 35° C. and more in particular between 10° C. and 30° C. Advantageously, in said second temperature range, in particular from said critical temperature upwards, a surface area of the part of the narrowest cross-sectional area that is not covered by the projection stays substantially constant.

As used herein, the terms "variable" and "stable" are to be understood as being defined relative to another where "variable" means a viscosity change over a temperature range that is at least 2 times higher when compared to the viscosity change in the "stable" regime for a same span temperature range. For example, when the term "stable" means that the kinematic viscosity varies at most a factor of 2 or 3 over a temperature range which spans about 40° C., the term "variable" means that the kinematic viscosity varies at least a factor of 4 or 6 over a temperature range which spans about 40° C. As a specific example, a hydraulic fluid having a kinematic viscosity of 750 $mm^2/s$ at −20° C., 150 $mm^2/s$ at 20° C., 120 $mm^2/s$ at 30° C. and 40 $mm^2/s$ at 70° C. is "variable" in a lower temperature range (e.g. from −20° C. to 20° C.) and "stable" in an upper temperature range (e.g.

from 30° C. to 70° C.) with a critical temperature between 20° C. and 30° C. It should be understood that the separation between the stable temperature range and the variable temperature range is not necessarily clear cut. In other words, the term "critical temperature" has to be understood as covering a narrow range of temperatures, e.g. spanning about 5° C. to 10° C.

The dashpot according to the present invention is ideally suited to be used in combination with a hydraulic fluid which is variable in a lower temperature range and stable in an upper temperature range. The elongated body of the needle valve continuously expands with increasing temperature causing the tip to be moved in relation to the narrowest cross-sectional area of the second restricted fluid passage thereby reducing the cross-sectional area through which hydraulic fluid is able to flow. However, as from a certain expansion (i.e. a certain temperature), the tip has maximally covered the narrowest cross-sectional area and the clearance (which corresponds to the non-covered area) between the narrowest cross-sectional area and the tip body of the needle valve tip no longer varies. The clearance-based compensation mechanism of the dashpot according to the present invention thus displays the same behaviour as the hydraulic fluid in the sense that it varies in a first (i.e. lower) temperature range and is stable in a second (i.e. upper) temperature range. In such a dashpot, it is then also advantageous to align the needle tip position with the hypothetical plane in which the narrowest cross-sectional area is determined so that, at the critical temperature (i.e. at about the temperature where the hydraulic fluid shifts from variable to stable), the tip maximally covers the narrowest cross-sectional area, ensuring that the clearance, i.e. the part of the narrowest cross-sectional area that is not covered by the projection, remains stable.

Furthermore, by using such a hydraulic fluid, the compensation mechanism in essence only has to be operable over a more limited temperature range, namely the temperature range where the hydraulic fluid is variable. This reduces design constraints on the compensation mechanism.

In an embodiment according to the present invention the hydraulic fluid has a viscosity index of at least 100 determined in accordance with ISO 2909:2002. A higher viscosity index is desirable, because it provides a more stable fluid over a wider temperature range.

In an embodiment according to the present invention the needle valve is adjustable to adjust a position of the tip with respect to the narrowest cross-sectional area of the second restricted fluid passage. This allows calibrating the tip position with respect to the narrowest cross-sectional area for each dashpot individually to its desired position, e.g. with the tip maximally covering the narrowest cross-sectional area at the critical temperature. Such an adjustable valve may be used for compensating manufacturing tolerances that would otherwise cause a deviation between actual the tip position and the desired tip position.

In an embodiment according to the present invention the needle valve comprises a base, in particular a metal base, on which the first end of the elongated body is mounted, the base having a threaded outer area which engages a corresponding threaded area of the housing to mount the metal base on the housing. The use of threads are a known and convenient way to allow a length-wise adjustment using a rotational motion. The metal base ensures that the use of a tool to perform the adjustment does not damage the needle valve itself, which is a risk if a plastic base would be used. A seal (e.g. a sealing ring) can be applied on the outer surface of the base to ensure that no hydraulic fluid leaks from the closed cavity.

In an embodiment according to the present invention the elongated body is made of a material having a first coefficient of thermal expansion and the housing is made of a material having a second coefficient of thermal expansion, a difference between the first and second coefficient of thermal expansion being at least 50 μm/m° C. As described above, the different coefficients of thermal expansion are a known and reliable way to achieve a compensation mechanism. It has further been found that a difference of at least 50 μm/m° C. results in an adequate movement of the tip to achieve the desired clearance variation which offsets the temperature-induced viscosity change.

In an embodiment according to the present invention the elongated body extends substantially along said normal direction, the tip comprising a tapered free end and a tip body which fits inside the narrowest cross-sectional area. In this embodiment, the needle valve extends substantially perpendicular to the narrowest cross-sectional area of the second restricted fluid passage. The needle valve can therefore be placed into the same bore as which forms the second restricted fluid passage. A change in temperature will move the tip with respect to the narrowest cross-sectional area with the tapered free end (i.e. a free end having a decreasing cross-sectional area when moving towards the tip) thus causing a change in the clearance. The hydraulic fluid flow is not required to undergo drastic changes in direction near the narrowest cross-sectional area thus allowing a steady flow.

In such an embodiment, the tip body is preferably cylindrical with the two-dimensional shape formed by the projection being a circle which is smaller than the narrowest cross-sectional area. Firstly, this shape is easy to manufacture compared to shapes having varying cross-sections at various heights. Secondly, the fluid flow along a cylinder is easier to model than around a shape having varying cross-sections at various heights which makes it easier to determine which clearance is needed in the upper temperature range. Thirdly, unexpected fluid flow effects (e.g. pressure drops, dead zones, etc.) may occur with a tip body having varying cross-sections at various heights.

In a preferred embodiment according to the present invention the tip body has a widest cross-sectional area which is at most 20%, particularly at most 15% and more particularly at most 10%, smaller than said narrowest cross-sectional area. The widest cross-sectional area is determined in a hypothetical plane parallel to the plane in which the narrowest cross-sectional is determined. It has been found that larger area differences tended to lead to a too large hydraulic fluid flow through the second restricted fluid passage which interfered with a dashpot in which the closing speed was adjustable through varying the cross-sectional area of the first restricted fluid passage.

In a preferred embodiment according to the present invention the second restricted passage comprises an elongated bore in the housing, the elongated bore having a first wider section and a second narrower section which are preferably cylindrical, the second section advantageously having a cross-sectional area identical to said narrowest cross-sectional area. Firstly, cylindrical shapes are easy to manufacture compared to shapes having varying cross-sections at various heights. Secondly, the fluid flow in a cylinder is easier to model than in a shape having varying cross-sections at various heights which makes it easier to determine which clearance is needed in the upper temperature range. Thirdly, unexpected fluid flow effects (e.g. pressure drops, dead zones, etc.) may occur with a tip body having varying cross-sections at various heights.

In a preferred embodiment according to the present invention the tip of the needle valve has an inclination angle of less than 30 degrees. The angle is measured with respect to a longitudinal direction defined by the elongated body. Such a low inclination angle causes a gradual change in clearance area with thermal variation which aids in achieving temperature variations over a larger temperature range. Needle valves in the prior art usually have a high inclination thus limiting their temperature range.

In a preferred embodiment according to the present invention the tapered free end of the needle valve is conical. This shape is easier to manufacture when compared to non-conical (e.g. pyramid) shapes.

In an alternative embodiment according to the present invention the elongated body extends substantially in a direction parallel to said hypothetical plane with the tip being adjacent the narrowest cross-sectional area. In this alternative embodiment, the needle valve is perpendicular to the flow direction through the narrowest cross-sectional area (i.e. the normal direction). The main advantage is that the second restricted fluid passage can be formed with a constant cross-sectional area thus requiring only a single tool. However, such a design requires the hydraulic fluid flow to follow an angled flow path (i.e. undergoing a 90° change in direction) which may hamper a steady flow.

In an embodiment according to the present invention the elongated body has a length of at least 20 mm, in particular at least 25 mm and more in particular at least 30 mm. Having such a long elongated body enhances the effect of the thermal expansion coefficient in the sense that a larger displacement of the tip is achieved with a longer elongated body when compared to a shorter elongated body for a given temperature variation.

In an embodiment according to the present invention the dashpot comprises a first adjustable needle valve which cooperates with a valve seat formed in the first restricted fluid passage to allow adjusting said closing speed. This allows an end-user to adjust the closing speed as desired.

In an embodiment according to the present invention the dashpot comprises a third restricted fluid passage connecting the high pressure compartment and the low pressure compartment and determining an end stroke of the closing movement of the closure system, the dashpot preferably further comprising a second adjustable needle valve which cooperates with a valve seat formed in the third restricted fluid passage to allow adjusting said end stroke. Advantageously, the first restricted fluid passage connects to the high pressure compartment at a first location and the third restricted fluid passage connects to the high pressure compartment at a second location, the first location and the second location being at a different height viewed in the sliding direction. In absence of the third restricted fluid passage, the end stroke of the dashpot is identical to the closing speed. However, depending on the intended use of the dashpot, this may not be desired. For example, in a conventional outdoor gate, a quick end stroke is desired in order to reliable close the gate as the end stroke needs a sufficient force to depress a latch bolt. However, in other applications, a slow end stroke is desired, e.g. so called soft-close closure members that then typically cooperate with an electrically operated locking mechanism. Having inlets to the first restricted fluid passage and third restricted fluid passage at a different height allows to set an end stroke to either a slower value when compared to the closing speed or a higher value as the restricted fluid passages are independent from one another. This is different when compared to the dashpots referenced above where the inlets are at the same height meaning that the end stroke can only increase in speed when compared to the closing speed. Having an adjustable end stroke is further beneficial as it allows a user to adjust this as desired.

In an embodiment according to the present invention the tip of the needle valve is made of metal. A metal tip has a smaller manufacturing tolerance when compared to a plastic tip which positively influences the reliability of the compensation mechanism. It further has a low coefficient of thermal expansion (i.e. a coefficient of thermal expansion below 50 μm/m° C.) so that its deforms only minimally with temperature.

In an embodiment according to the present invention the elongated body is made of a material, such as a thermoplastic material, in particular a low density polyethylene, having a high coefficient of thermal expansion (i.e. above 150 μm/m° C.). This aids in achieving a sufficiently high displacement of the tip for a given temperature variation.

In an embodiment according to the present invention the narrowest cross-sectional area has an inner diameter comprised between 1 and 10 mm with particular lower limits of 1.5 mm and 2 mm and with particular upper limits of 7 mm and 4 mm.

In an embodiment according to the present invention the dashpot further comprises a damper shaft which is operatively coupled to the piston. This can be either a sliding damper shaft that is directly (or indirectly) fixed to the piston or it can be a rotatable damper shaft that is coupled to the piston via a motion converting mechanism to convert the relative rotation between the housing and the damper shaft into a sliding motion of the piston. The damper shaft is preferably made of a metal. A metal damper shaft is preferred to a damper shaft made of a polymeric material. Whilst the required strength in as compact a damper shaft as possible (i.e. a damper shaft with as small a radius as possible) is achievable using both a metal or a polymeric material, the metal option is often cheaper.

In an embodiment according to the present invention the second restricted fluid passage connects the high pressure compartment and the low pressure compartment for any position of the piston between said two extreme positions. The compensation mechanism is thus always part of the dashpot operation for any position of the piston thus ensuring a reliable closing speed for any position of the piston.

In an embodiment according to the present invention the dashpot further comprises a seal on the piston between the high pressure compartment and the low pressure compartment. This seals avoids any unwanted hydraulic fluid flow along the piston outside of the various restricted fluid passages.

The present invention is also directed to a hydraulically damped actuator for damping a closing movement of a closure system comprising the dashpot described above and therefore achieves the same advantageous effects. The hydraulically damped actuator preferably further comprises: a damper shaft that is rotatable with respect to the housing; an energy storing mechanism configured for storing energy when said closure member is being opened and for restoring said energy to effect closure of said closure member, the energy storing mechanism comprising a torsion spring having a first extremity operatively connected to the damper shaft and a second extremity operatively connected to the housing; and a motion converting mechanism interposed between the damper shaft and the piston to convert the relative rotation between the housing and the damper shaft into a sliding motion of the piston.

It will be readily appreciated that the various embodiments described above, although referred to as "preferred", are to be construed as exemplary manners in which the invention may be implemented rather than as limiting the scope of the invention. Moreover, these various embodiments may be readily combined with one another.

BRIEF DESCRIPTION OF THE DRAWINGS

The invention will be further explained by means of the following description and the appended figures. Other particularities and advantages of the invention will become apparent from the following description of some particular embodiments of a mortice lock and of a keep according to the present invention. The reference numerals used in this description relate to the annexed drawing.

DESCRIPTION OF THE INVENTION

The present invention will be described with respect to particular embodiments and with reference to certain drawings but the invention is not limited thereto but only by the claims. Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes. The terms so used are interchangeable under appropriate circumstances and the embodiments of the invention described herein can operate in other orientations than described or illustrated herein.

The invention generally relates to a dashpot for damping a closing movement of a closure system having a support and a closure member that are hingedly connected to each other. The dashpot according to the present invention is either part of a hydraulically damped actuator or part of a hinge and may generally be used in any actuator or hinge embodiment disclosed in WO 2018/121890 A1. Details on how to mount the actuator or hinge to the closure system will not be described here and are assumed known to the skilled person.

The dashpot may be used for both orientations of closure systems as the actuator or hinge in which the dashpot is incorporated may be mounted in a differently oriented position depending on the handedness of the closure system. Specifically, for a right-handed closure system, the actuator or hinge is mounted with its longitudinal axis in a first orientation (e.g. upright or upside down), while, for a left-handed closure system, the actuator or hinge is mounted with its longitudinal axis in a second orientation that opposite to the first orientation (e.g. upside down or upright). This enables the energy storing mechanism and the dashpot to operate in the same way for both a right-handed closure system and a left-handed closure system. Naturally, different dashpots may also be provided for differently oriented closure systems. Moreover, mechanical systems are known in the art to allow a single dashpot to be used for differently oriented closure systems, e.g. such as disclosed in WO 2010/054867 A1 or EP 3 162 997 A1.

Figure 1:
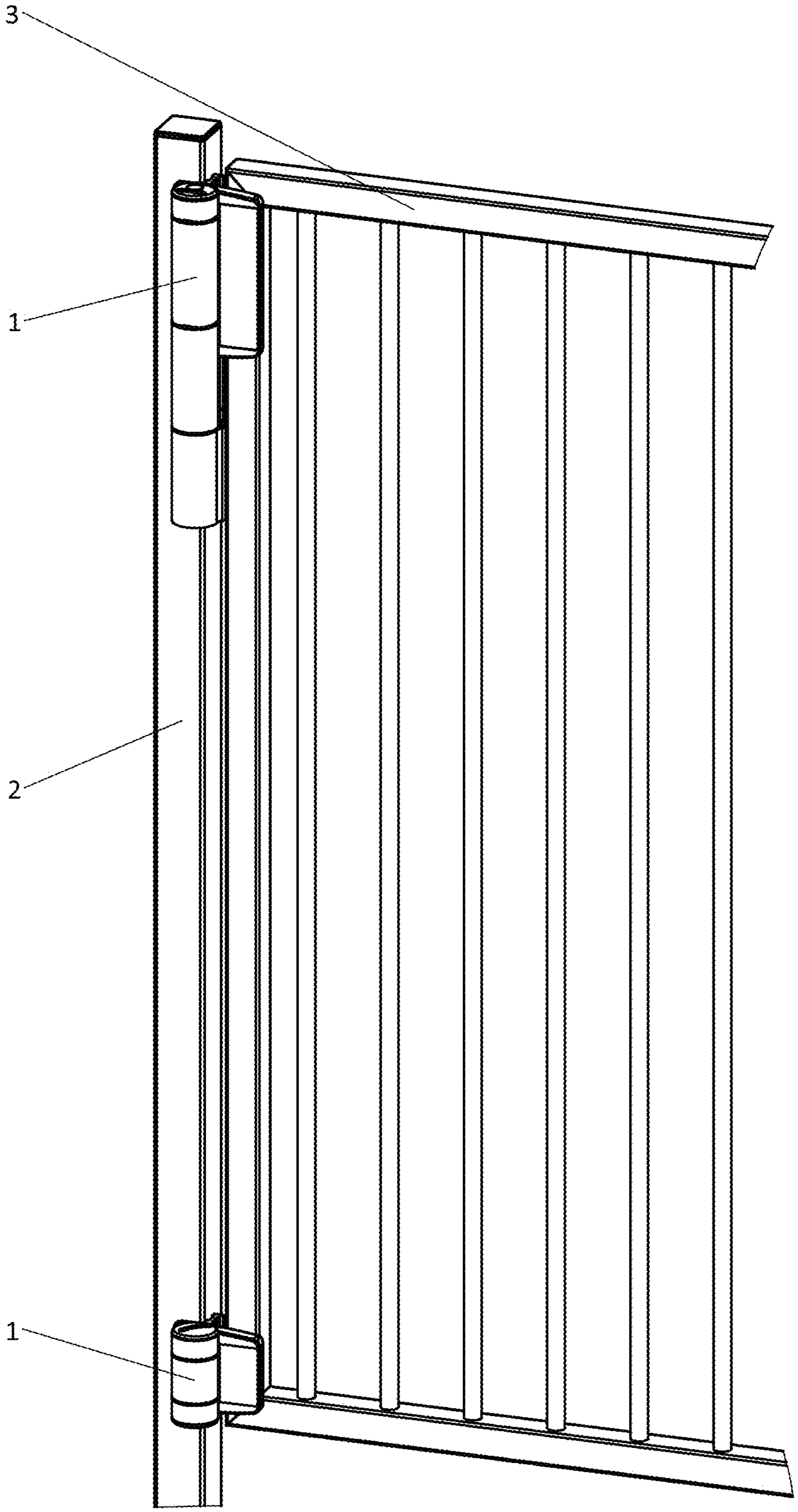
FIG. 1 shows a hydraulically damped actuator with a dashpot according to the present invention mounted on a closure system.

FIG. 1 shows an overview of a closure system having first member and a second member that are hingedly attached to one another by means of one or more hinges 1. The first member is typically a fixed support 2, such as a wall or a post, while the second member is typically a moveable closure member 3, such as a gate, a door, or a window. In this illustrated embodiment, the dashpot is incorporated in the top hinge 1. An opening/closing movement of the closure member 3 with respect to the support 2 is transferred, via leaves of the hinge, to the dashpot.

In a typical application, it is desired that the closure member 3 is self-closing. Generally, this may be achieved by providing an actuator that comprises an energy storing mechanism and a dashpot both of which are operatively connected with the members of the closure system. Naturally, the energy storing mechanism and the dashpot may be provided in different physical entities (e.g. a dashpot in a top hinge and the energy storing mechanism in a bottom hinge) that are separately attached to the same closure system. The energy storing mechanism is configured for storing energy when the closure system is being opened and for restoring the energy to effect closure of the closure system. The dashpot is configured for damping a closing movement of the closure system and comprises a piston that is slideable along the longitudinal direction within the actuator between two extreme positions.

Figure 2:
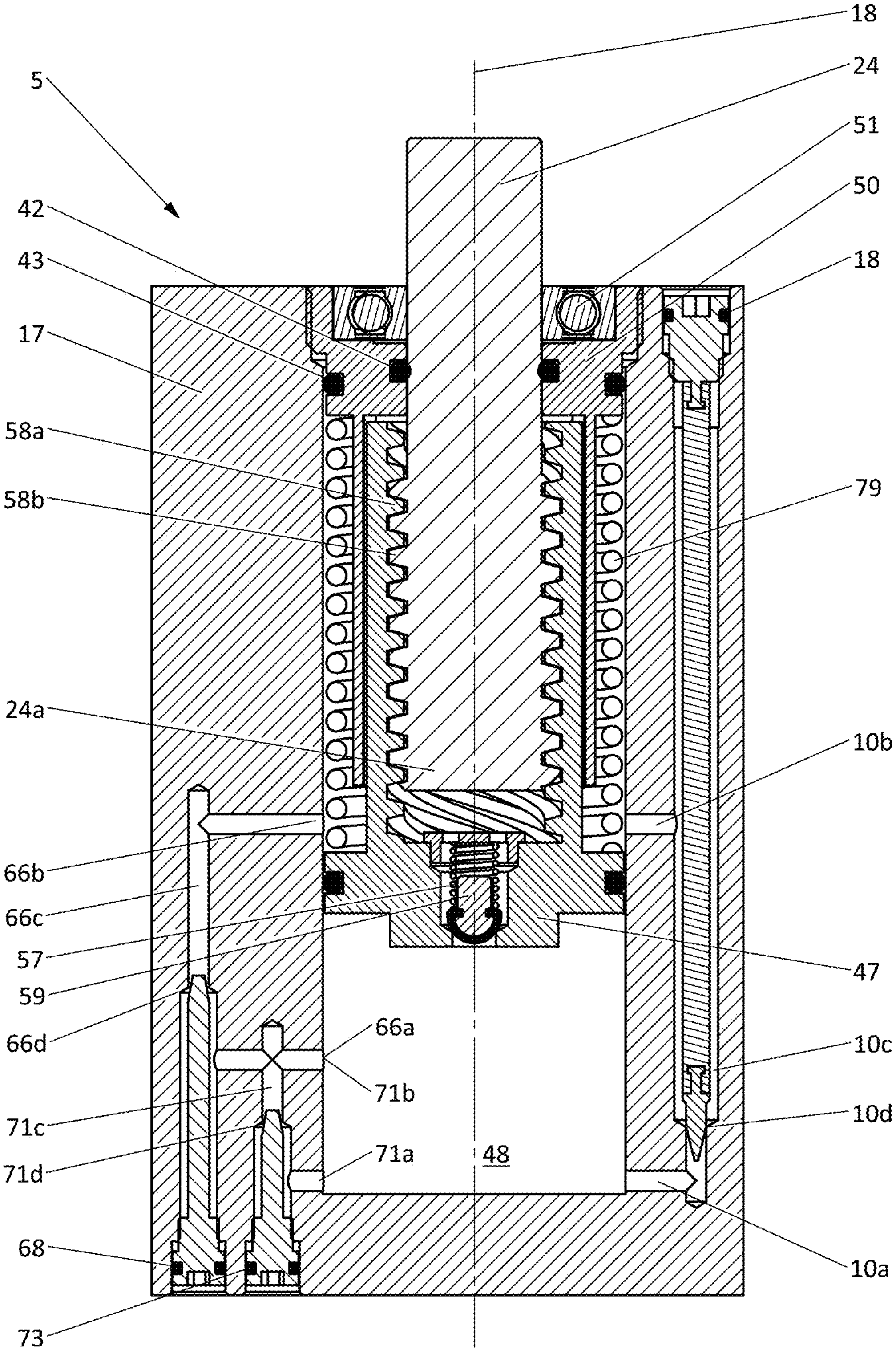
FIG. 2 shows a longitudinal cross-section through a first embodiment of a dashpot according to the present invention in the closed state.
Figure 3:
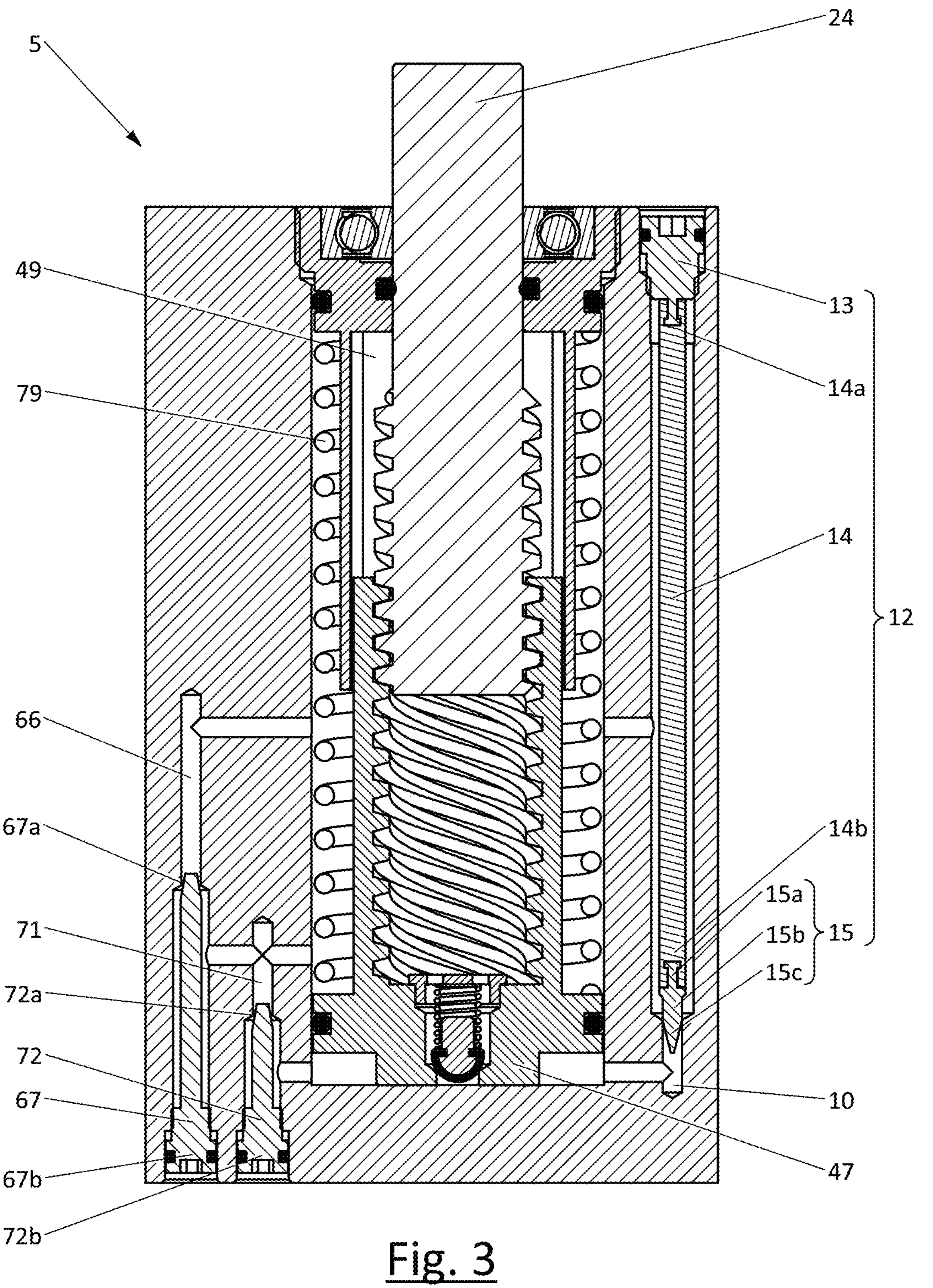
FIG. 3 shows a same view as FIG. 2 with the dashpot in the open state.

FIGS. 2 and 3 show a first embodiment of a dashpot 5 according to the present invention. The dashpot comprises a housing 17 in which a closed cylinder cavity is formed. The closed cylinder cavity is filled with hydraulic fluid. In the illustrated embodiment, the dashpot 5 uses a hydraulic fluid having a kinematic viscosity which is variable in a first, lower, temperature range and which is stable in a second, upper, temperature range (the second temperature range being non-overlapping with the first temperature range). The lower temperature range may, for example, be from any one of −40° C. or −30° C. or −20° C. to any one of 0° C. or 10° C. or 20° C. or 30° C. and/or the upper temperature range may, for example, be from any one 0° C. or 10° C. or 20° C. or 30° C. or 40° C. to any one of 40° C. or 50° C. or 60° C. or 70° C. or 80° C. Between these temperature ranges there is a critical temperature in which the kinematic viscosity shifts from variable to stable. The critical temperature may generally be comprised between 0° C. and 40° C., in particular between 5° C. and 35° C. and more in particular between 10° C. and 30° C. and may span a range of several degrees, e.g. 15° C. to 25° C. The hydraulic fluid in the illustrated embodiment has a viscosity index of at least 100 determined in accordance with ISO 2909:2002.

The dashpot 5 comprises a shaft 24 that extends along the length of the housing 17 along a longitudinal direction 18 of the housing 17. The shaft 24 has a first extremity (not shown) that is operatively connected to closure system (e.g. through a mechanical connector). The shaft 24 has a second extremity 24*a* on which a piston 47 is mounted. The shaft 24 transfers the opening and closing movement of the closure system to the dashpot and is therefore also referred to as the damper shaft 24. In other words, a rotation (i.e. opening or closing of the closure system) results in a relative rotation of the damper shaft 24 with respect to the housing 17.

The dashpot further comprises a piston 47 placed in the closed cylinder cavity to divide the closed cylinder cavity into a high pressure compartment 48 and a low pressure compartment 49 (indicated in FIG. 3). The dashpot also comprises a motion converting mechanism to convert the relative rotation between the cylinder barrel 17 and the damper shaft 24 into a sliding motion of the piston 47 between two extreme positions. The first extreme position is shown in FIG. 2 where the piston 47 is located at one end of the closed cylinder cavity with the high pressure compartment 48 having its maximal volume. The first extreme position corresponds to the actuated state of the dashpot in which the closure system is opened. The second extreme position is shown in FIG. 3 where the piston 47 is located at the opposing end of the closed cylinder cavity with the low pressure compartment 49 having its maximal volume. The second extreme position corresponds to the rest state of the dashpot in which the closure system is closed.

The motion converting mechanism comprises a locking element 50 that is fixed with respect to the housing 17. The locking element 50 usually has several ridges and/or grooves (not shown) that cooperate with corresponding ridges and/or grooves (not shown) provided on the piston 47 so as to prevent a rotation of the piston 47 with respect to the housing 17. Two mutually co-operating screw threads 58*a*, 58*b* cause a relative rotation of the damper shaft 24 to be converted into a sliding motion of the piston 47. Further details of the motion converting mechanism are described in WO 2018/121890 A1 filed by the Applicant and are considered incorporated herein by reference.

In the illustrated embodiment, a bearing 51, e.g. a roller bearing such as a ball bearing, is provided around the damper shaft 24 where the locking element 50 is positioned to aid in a smooth relative rotation of the damper shaft 24 with respect to the locking element 50 that is stationary with respect to the housing 17.

In the illustrated embodiment, the dashpot 5 is provided with a compression spring 79 that is interposed between the locking element 50 and the piston 47. A top end of the compression spring 79 engages the locking element 50 and a bottom end of the compression spring 79 engages the piston 47. An opening motion of the closure system results in the piston 47 sliding towards the locking element 50 thus compressing the compression spring 79 thereby increasing its potential energy. A release of this potential energy, i.e. extending the compression spring 79, urges the closure member 3 to its closed position. The compression spring thus forms the energy storing mechanism described above.

In an alternative non-illustrated embodiment, a torsion spring is used as energy storing mechanism. Such a torsion spring is interposed between the housing 17 and the damper shaft 24 and has a first extremity that is fixed with respect to the housing 17 and a second extremity that is fixed with respect to the damper shaft 24. An opening motion of the closure system results in the torsion spring being wound up thereby increasing its potential energy. A release of this potential energy, i.e. an unwinding of the torsion spring, urges the closure member 3 to its closed position. The torsion spring thus forms the energy storing mechanism described above.

In the illustrated embodiment, the closed cylinder cavity is closed at the bottom and is sealed off at the top by various seals. Specifically, at the top end of the housing 17, a first annular seal 42 is disposed around the damper shaft 24 and engages the inner wall of the locking element 50. This annular seal 42 prevents leakage of hydraulic fluid that could occur due to the relative rotation of the damper shaft 24 with respect to the locking element 50. A second annular seal 43 is disposed around the locking element 50 and engages the inner wall of the housing 17. As these seals 42, 43 are in the low pressure compartment 49, there is a reduced risk of leakage. However, other configurations are possible where the bottom end of the closed cylinder cavity is closed off by one or more seals, for example in embodiments where the damper shaft 24 extends through the housing 17.

The dashpot further comprises a one-way fluid passage 57 which allows the hydraulic fluid to flow from the low pressure compartment 49 of the closed cylinder cavity to the high pressure compartment 48 thereof when the closure system is being opened. The opening movement of the closure system is therefore not damped or at least to a smaller extent than the closing movement. This one-way passage 57 may be provided in the piston 47, in particular in a fluid passage through the piston 47. In the illustrated embodiment, the one-way passage 57 comprises a one-way valve 59, e.g. a spring-biased ball valve, to achieve the one-way behaviour.

The piston 47 may also provided with a further one-way fluid passage with a safety valve (not shown) which enables flow of hydraulic fluid in the opposite direction (i.e. from the high pressure compartment 48 to the low pressure compartment 49) but only in case the pressure in the high pressure compartment 48 of the cylinder cavity would exceed a predetermined threshold value, for example when an external closing force would be exerted onto the closure member 3 which could damage the dashpot 5. The spring provided in such a safety valve has thus a much larger spring constant than the spring provided in the one-way valve as the safety valve should not be opened under normal operating conditions. This further one-way fluid passage may be provided in the piston 47.

To achieve the damping action upon closing of the closure system, at least one restricted fluid passage is provided between the compartments 48, 49 of the closed cylinder cavity. In the illustrated embodiment, the damping is achieved by use of two different restricted fluid passages, namely a first restricted fluid passage 66 and a second restricted fluid passage 71 that are each formed by a plurality of bores in the housing 17. There is also a third restricted fluid passage 10 which, as described below, forms (part of) the compensation system to compensate temperature-induced viscosity changes of the hydraulic fluid.

The first restricted fluid passage 66 comprises an inlet 66*a*, an outlet 66*b*, a connecting bore 66*c* and a valve seat 66*d* formed in the connecting bore 66*c*. The second restricted fluid passage 71 comprises an inlet 71*a*, an outlet 71*b* coinciding with the inlet 66*a* of the first restricted fluid passage 66, a connecting bore 71*c* and a valve seat 71*d* formed in the connecting bore 71*c*. The third restricted fluid passage 10 comprises an inlet 10, an outlet 10*b*, a connecting bore 10*c* and a valve seat 10*d* formed in the connecting bore 10*c*. The inlets 10*a*, 71*a* are in the high pressure compartment 48 for any position of the piston 47 while the outlets 10*b*, 66*b* are in the low pressure compartment 49 for any position of the piston 47. The inlet 66*a* or outlet 71*b* is either in the high pressure compartment 48 or the low pressure compartment 49 depending on the position of the piston 47 as shown in FIGS. 2 and 3.

In the illustrated embodiment, each restricted fluid passage 10, 66, 71 is provided with a needle valve 12, 67, 72. The needle valves 67, 72 have tapered free end 67*a*, 72*a* that is located at a corresponding valve seat 66*d*, 71*d*. A clearance between the tapered free end and the valve seat determines a fluid flow rate through the restricted fluid passages 66, 71. The end 67*b*, 72*b* of the adjustable valves 67, 72 opposite the tapered free end 67*a*, 72*a* is screwed into the extension of the bores 66, 71 using a threaded portion. The top face of the ends 67*b*, 72*b* is accessible from outside the dashpot 5. As such, the valves 67, 72 may be rotated when the dashpot 5 is mounted, which rotation causes the tapered free end 67*a*, 72*a* to move upwards or downwards thereby changing the clearance within the restricted fluid passages 66, 71. It will be readily appreciated that the dashpot 5 may also be provided without an adjustable valve in which case the fluid flow rates through the restricted fluid passages 66, 72 is fixed. For example, the needle valves 67, 72 may be fixed within the housing 17 without allowing a rotation to change the clearance. Sealing rings 68, 73 are also provided on an outer surface of the valves 67, 72 to prevent hydraulic fluid leakage from the closed cavity.

As shown in FIGS. 2 and 3, the needle valve 12 comprises a base 13, an elongated body 14 and a tip 15.

The base 13 is screwed into the housing 17, in particular in an extension of the bore 10 using a threaded portion. The top face of the base 13 is accessible from outside the dashpot 5. As such, the base 13 and valve 12 may be rotated when the dashpot 5 is mounted, which rotation causes the tip 15 to move upwards or downwards thereby changing the clearance within the restricted fluid passage 10. The base 13 is preferably manufactured from metal which makes it more robust to be rotated by a tool. A sealing ring 18 is provided on an outer surface of the base 13 to prevent hydraulic fluid leakage from the closed cavity.

The elongated body 14 extends between a first end 14*a* mounted on the base 13 and a second end 14*b*. A length of the elongated body 14 is temperature dependent. In the illustrated embodiment, this is achieved by manufacturing the elongated body 14 from a material having a high coefficient of thermal expansion (e.g. above 100 μm/m° C. or 150 μm/m° C.). Various materials have such a high coefficient of thermal expansion, e.g. thermoplastic materials such as a low density polyethylene. In addition to the material selection, the elongated body 14 is made sufficiently long with a length of at least 20 mm, in particular at least 25 mm and more in particular at least 30 mm. As such, a temperature increase of 10° C. increases the length of the elongated body 14 with at least 0.03 mm.

The tip 15 is mounted on the elongated body 14 at the second end 14*b*. The tip 15 comprises a mechanical mounting member 15*a*, a tip body 15*b* and a tapered free end 15*c*. The tip 15 is preferably manufactured from a metal which, as described above, has a low manufacturing tolerance and also a low thermal expansion coefficient. The tip body 15*b* is cylindrical which, as described above, has several advantages. In the illustrated embodiment, the tapered free end 15*c* is generally conical in shape with an inclination angle β (indicated in FIG. 5B) with respect to the longitudinal direction 25 defined by the elongated body 14 which is about 15°.

Figure 5A:
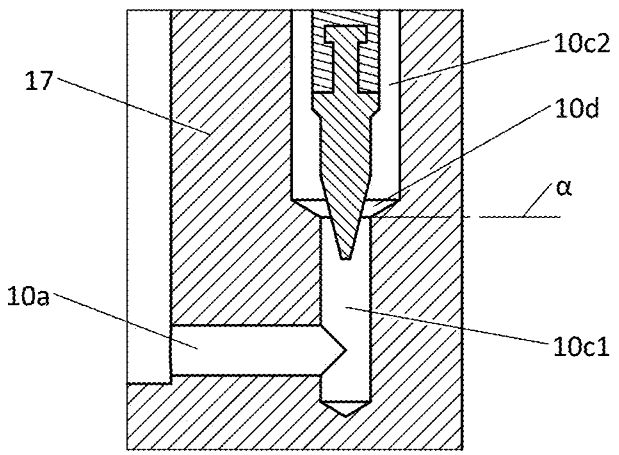
FIGS. 5A to 5C show a detail of the compensation mechanism for various temperatures.
Figure 5B:
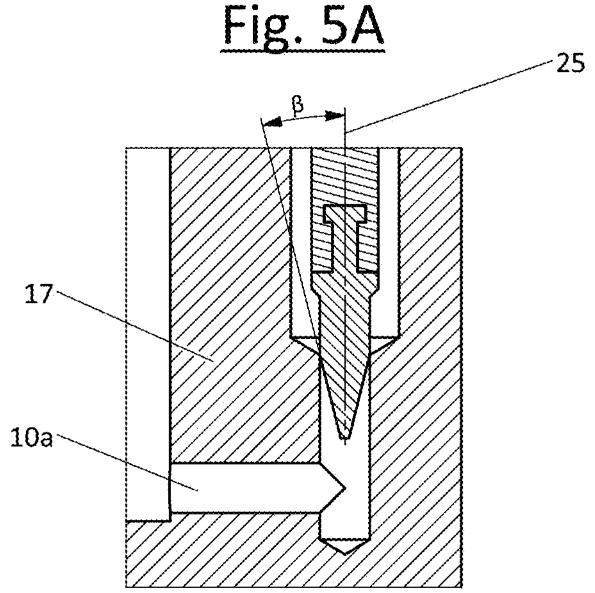
Figure 5C:
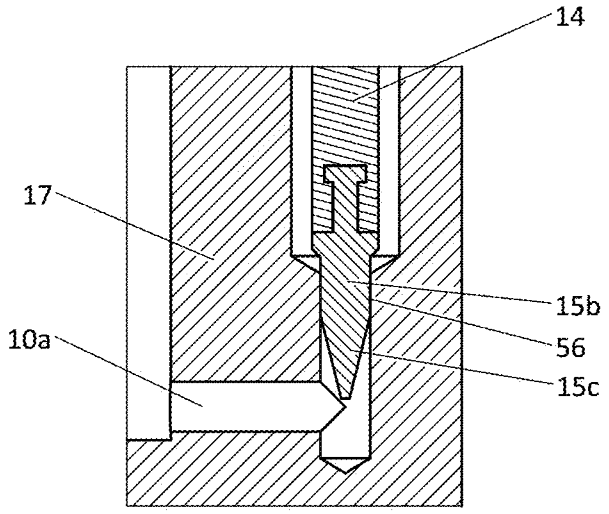

As best shown in FIGS. 5A to 5C, the connecting bore 10*c* comprises a first section $\mathbf{10}c_1$ and a second section $\mathbf{10}c_2$. Both sections are cylindrical in the illustrated embodiment and a valve seat 10*d* is formed therebetween. The first section $\mathbf{10}c_1$ is narrower than the second section $\mathbf{10}c_2$ and determines a narrowest cross-sectional area of the third restricted fluid passage 10. Since the first section $\mathbf{10}c_1$ is cylindrical, its cross-sectional area is constant over its length. However, in other embodiments, the first section $\mathbf{10}c_1$ could have a varying cross-section. The narrowest cross-sectional area is thus best determined in a hypothetical plane α (shown in FIG. 5A) adjacent the valve seat 10*d*, which hypothetical plane α determines a normal direction. A clearance 56 between the tip 15 and the narrowest cross-sectional area determines a fluid flow through the third restricted fluid passage 10.

As shown in FIG. 5A to 5C, the tip body 15*b* fits inside the first section $\mathbf{10}c_1$ so that there is always a hydraulic fluid flow possible along the third restricted fluid passage 10. In other words, the projection of the tip body 15*b* onto the hypothetical plane α in the normal direction does not fully cover the narrowest cross-sectional area. In particular, in the illustrated embodiment, the projection of the tip body 15*b* onto the hypothetical plane α forms a circle having a diameter which is only marginally smaller, for example about 1% or 2%, than the diameter of the first section $\mathbf{10}c_1$.

As described above, temperature changes affect the viscosity of the hydraulic fluid in such a way that the damping force increases as temperature increases. This is a particular problem for outdoor applications where the hinge may be subject to large temperature variations. It is thus necessary to include a compensation mechanism in order to counter temperature-induced changes in hydraulic fluid viscosity.

This is achieved by relying on the concept described in WO 2021/170871 A1 and EP 3 907 418 A1. More specifically, the compensation mechanism relies on a varying clearance between the needle valve 12 and the narrowest cross-sectional area in the first section $\mathbf{10}c_1$ of the third restricted fluid passage 10. This is best illustrated in FIGS. 5A to 5C which show the placement of the tip 15 with respect to the valve seat 10*d* on a low (e.g. −30° C. or −20° C. or −10° C.) temperature (FIG. 5A), an intermediate (e.g. 10° C. or 20° C. or 30° C.) temperature (FIG. 5B), and an upper (e.g. 60° C. or 70° C. or 80° C.) temperature (FIG. 5C). The elongation of the elongated body 14 due to temperature causes the illustrated shifted displacement of the tip 15 and the narrow tip body 15*b* ensures that the third restricted fluid passage 10 cannot be fully closed.

As best shown when comparing FIGS. 5A and 5B, at a low temperature, the clearance between the tip 15 and the narrowest cross-sectional area in the first section $\mathbf{10}c_1$ of the third restricted fluid passage 10 is quite high which offsets the high fluid viscosity. As the temperature increases, the elongated body 14 increases in length so that the clearance becomes smaller (see FIG. 5B). As described above, the preferred hydraulic fluid has a viscosity which becomes stable with higher temperatures. This behaviour is mimicked in the compensation mechanism as the clearance (i.e. the part of the narrowest cross-sectional area which is not covered by the projection of the tip body 15*b* onto the hypothetical plane a) remains unchanged in the upper temperature range. This is clear from FIGS. 5B and 5C where, although the tip 15 has moved, the clearance remains substantially the same. The adjustability of the needle valve 12 (e.g. by rotating the base 13) allows calibrating the tip 15 position with respect to the narrowest cross-sectional area (i.e. plane α) so that, at the critical temperature range of the hydraulic fluid, the tip body 15*b* is fully located on one side of the plane α and the tapered free end 15*c* is on the other side of that plane α.

It will be readily appreciated that the roles of the housing 17 and the needle valve 12 could be reversed. More specifically, the housing could be manufactured from a material having a high thermal expansion coefficient (e.g. a thermoplastic material such as a low density polyethylene) while the needle valve is manufactured from a material having a low thermal expansion coefficient (e.g. a metal such as stainless steel). In such an embodiment, the housing (in which the third restricted fluid passage is formed) becomes longer with increasing temperature with respect to the needle valve. This relative movement can offset temperature induced changes in viscosity of the hydraulic fluid.

Upon closing the closure system, the piston 47 moves downwards in FIG. 2 and hydraulic fluid flow is forced along the first restricted fluid passage 66. There will be little fluid flow along the second restricted fluid passage 71 when compared to the flow rate in the first restricted fluid passage 66 since the inlet 66*a* has a much larger cross-sectional area than the second restricted fluid passage 71. As described above, the clearance (and thus possible fluid flow) in the third restricted fluid passage 10 is temperature dependent and offsets the fluid viscosity changes. As such, the closing speed of the dashpot is determined by the first restricted fluid passage 66. Near the end of the closing movement, the piston 47 passes the inlet 66*a* so that there is no longer any fluid flow along the first restricted fluid passage 66 as both the inlet 66*a* and outlet 66*b* are in the same low pressure compartment 49. Rather the fluid flow is now along the third restricted fluid passage 71 which thus determines the end-stroke or final closing speed of the dashpot. Again the clearance (and thus possible fluid flow) in the third restricted fluid passage 10 is temperature dependent and offsets the fluid viscosity changes.

The dashpot 5 is mainly used outdoors where large temperature variations are not uncommon. For example, summer temperatures up to 70° C. when the dashpot 5 is exposed to sunlight and winter temperatures below −30° C. are not uncommon, i.e. temperature variations up to and possibly even exceeding 100° C. are possible. Moreover, there are also daily temperature variations between night and day which can easily exceed 30° C. when the dashpot 5 is subjected to direct sunshine. These temperature variations cause expansion, and also contraction, of the hydraulic fluid, which could affect the operation of the dashpot. In particular, the expansion due to temperature variations can be up to 1% of the volume of hydraulic fluid for a temperature variation of 10° C., depending on the expansion coefficient of the hydraulic fluid. As such, an expansion of, for example, up to 3 ml for a temperature difference of 50° C. is possible.

To counter this expansion, a small amount of gas such as air could be provided in the hydraulic fluid itself. However, it has been found that this gas may interfere with the good working of the dashpot 5, especially when gas bubbles, or an emulsion of the gas in the hydraulic fluid, passes through the restricted fluid passages and provides a smaller damping effect than pure hydraulic fluid. Consequently, the hydraulic fluid is preferably free of gas bubbles. In the dashpot 5 illustrated in the drawings, expansion of the hydraulic fluid is countered by means of an expansion channel (not shown). Further details of the expansion channel are described in WO 2018/121890 A1 filed by the Applicant which is incorporated herein by reference.

In the illustrated embodiments, the damper shaft 24 is made, preferably extruded, from a metal, preferably aluminium. A metal damper shaft 24 is preferred as it is economically often cheaper to obtain the required strength in a compact damper shaft using metal. Having the damper shaft 24 as compact as possible is beneficial as this leaves more volume to provide hydraulic fluid within a same outside diameter hinge. In other words, the maximal volume of the closed cylinder cavity is increased by reducing the diameter of the damper shaft 24.

Figure 4:
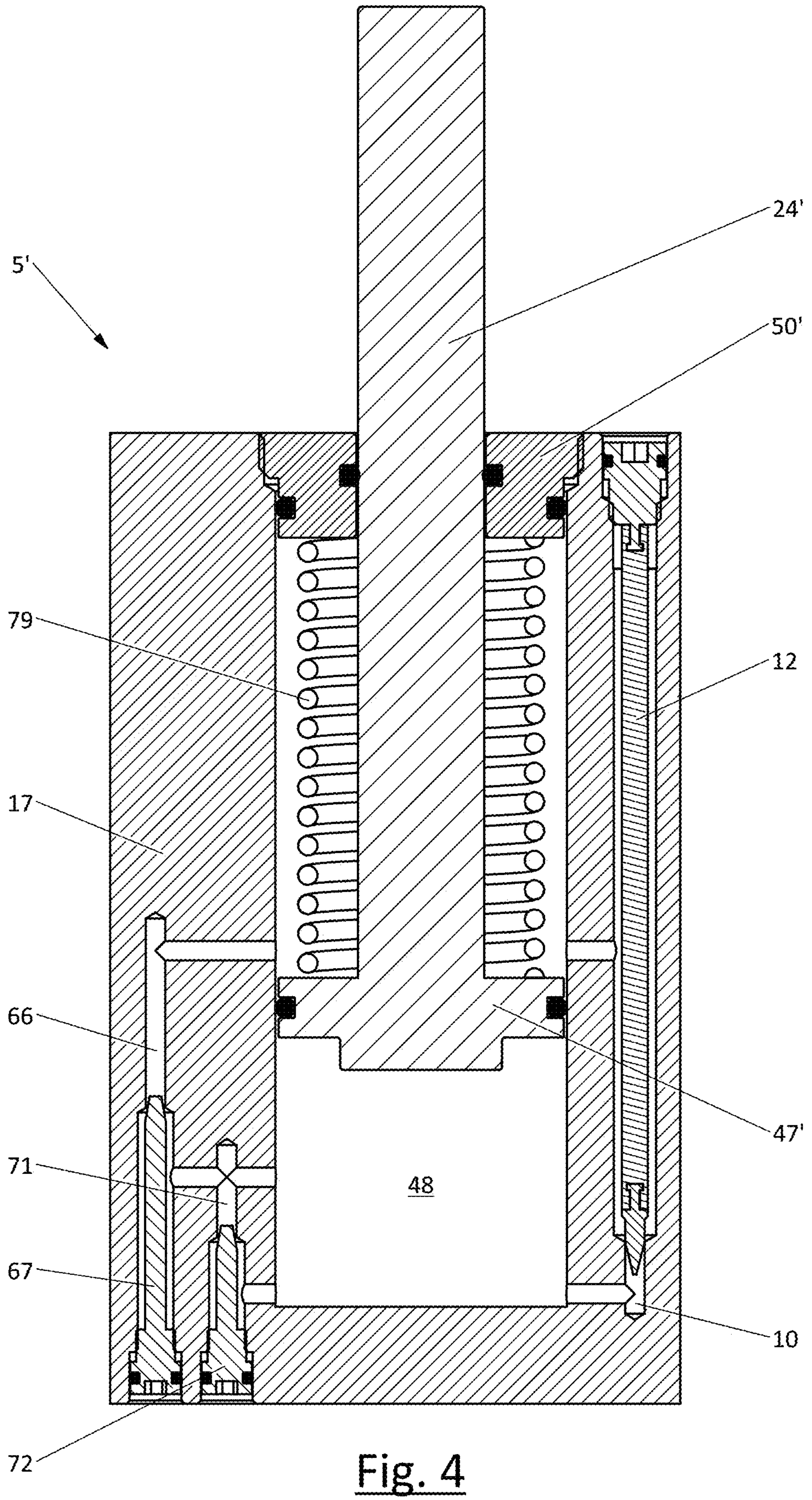
FIG. 4 shows a longitudinal cross-section through a second embodiment of a dashpot according to the present invention in the closed state.

FIG. 4 shows a second embodiment of a dashpot 5' according to the present invention. The only difference between dashpots 5, 5' is the driving mechanism of the piston 47. More specifically, dashpot 5 relies on a rotatable damper shaft 24 with a motion converting mechanism to achieve a sliding motion of the piston 47. The dashpot 5' on the other hand relies on a damper shaft 24' that is directly fixed to the piston 47'. This simplifies the design inside the closed cavity as no locking element 50 is required and simpler seal cap 50' can be used to close of the closed cavity. It however typically complicates the connection to the closure system as its rotary motion needs then to be converted into a sliding motion of the damper shaft 24. This may be achieved by a rack and pinion system for example where the pinion is connected to or formed in the damper shaft 24'. The operation of the damping mechanism of the dashpot 5' is identical to that of dashpot 5 and will not be described.

Figure 6A:
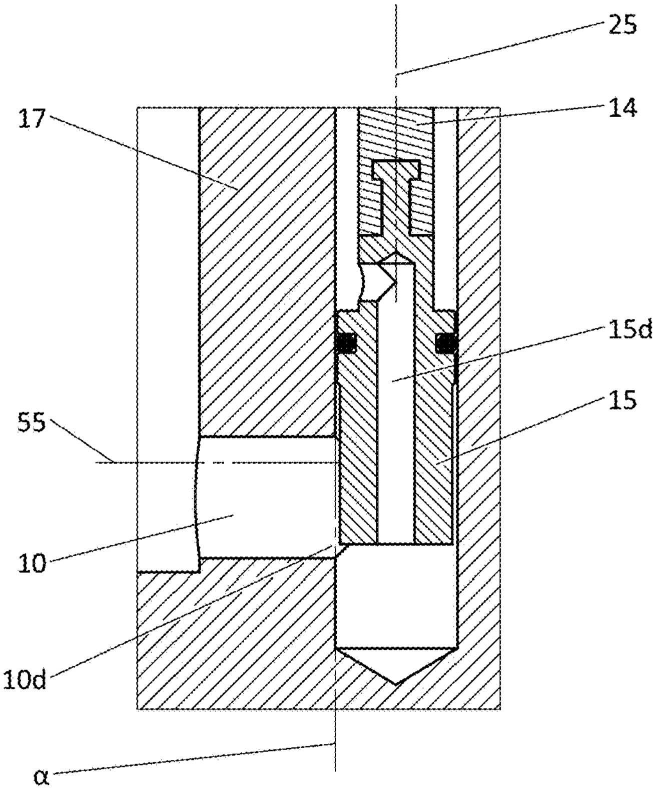
FIG. 6A shows a similar view to FIGS. 5A to 5C for an alternative compensation mechanism.
Figure 6B:
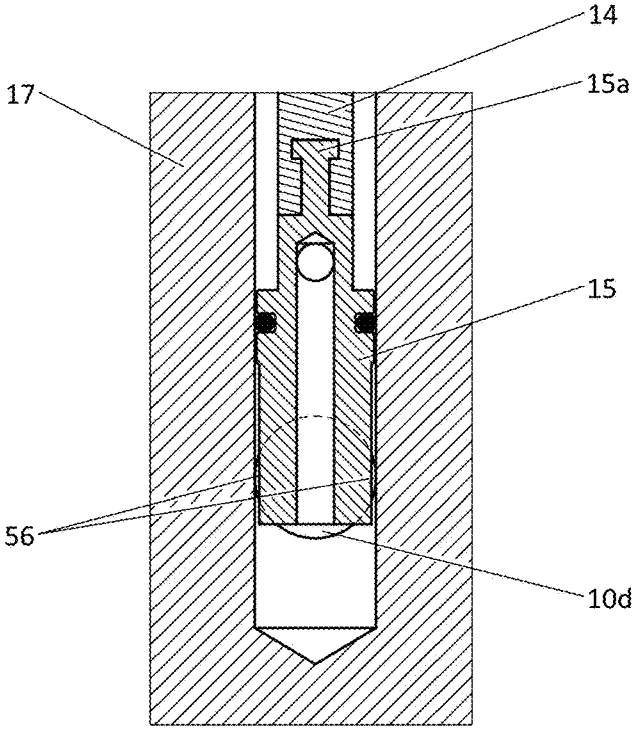
FIG. 6B shows a cross-section through the alternative compensation mechanism of FIG. 6A in a plane perpendicular to the cross-section of FIG. 6A.
Figure 7:
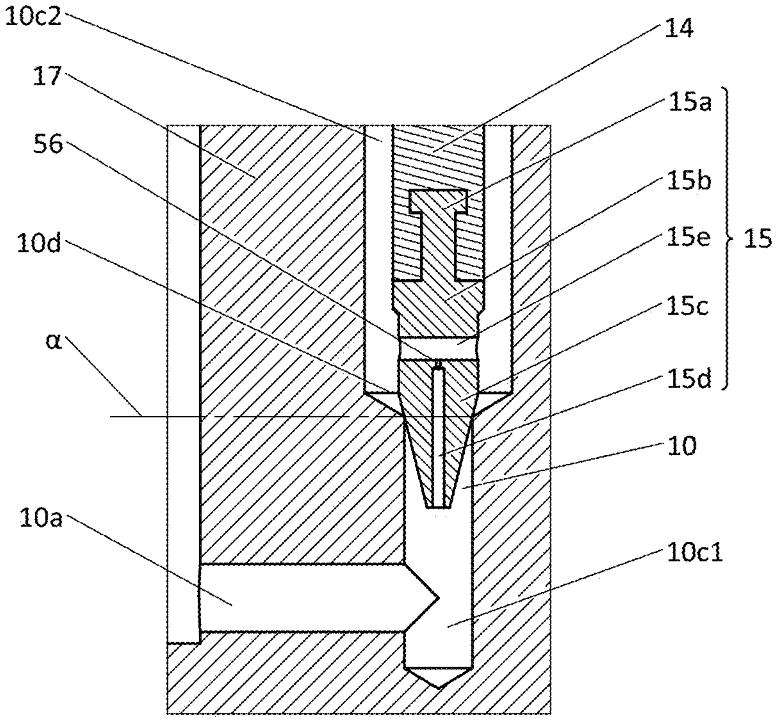
FIG. 7 shows a similar view to FIGS. 5A to 5C for another alternative compensation mechanism.

FIGS. 6A and 6B shows a first alternative embodiment of a compensation system to compensate temperature-induced viscosity changes of the hydraulic fluid. FIG. 7 shows a second alternative embodiment of a compensation system to compensate temperature-induced viscosity changes of the hydraulic fluid. Both alternative embodiments may be used as a substitution of the compensation system described above and represented in FIGS. 1 to 5C. The alternative embodiments also rely on using a separate third restricted fluid passage 10 which cooperates with an elongated needle valve having a temperature dependent elongated body 14 as described above.

In the first alternative embodiment, the placement of the needle valve 12 with respect to the narrowest cross-section is different. More specifically, the narrowest cross-section is determined in bore section 10*d* in hypothetical plane α which has a normal direction 55. The needle valve 12 is positioned adjacent the bore section 10*d* and extends substantially perpendicular to the normal direction, i.e. along direction 25. The tip 15 is displaced in direction 25 due to temperate changes causing an elongation or contraction of the elongated body 14. Due to this, the tip 15, as shown in FIG. 6B, covers more or less of the bore section 10*d*. However, the tip 15 is less wide than the bore section 10*d* so that a clearance 56 always exists. In other words, the projection of the tip 15 onto the hypothetical plane a in the normal direction 55 (which is best shown in FIG. 6B) does not cover the narrowest cross-sectional area since regions 56 are not covered. A connection bore passage 15*d* is provided in the tip 15 to allow hydraulic fluid flow over the tip 15. This ensures that a hydraulic fluid flow from the high pressure compartment 48 to the low pressure compartment 49 is always possible even when the needle valve 12 has elongated due to a high temperature so that the tip 15 extends beyond the lower contour of bore section 10*d*.

In the second alternative embodiment shown in FIG. 7, the only difference with respect to the embodiment shown in FIGS. 1 to 5C is that the tip body 15*b* is now wider than then narrowest cross-sectional area defined by the bore section 10*c*1 in plane α. As such, the tip body 15*b* no longer fits inside the bore section 10*c*1 and the bore section 10*d* acts as a conventional valve seat preventing hydraulic fluid flow between the valve seat 10*d* and the tip 15 once the temperature is high enough. The tip 15 in this embodiment is provided with an internal passage opening comprising a first bore 15*d* extending through the tapered free end 15*d* upwards, a transverse bore 15*e* extending through the tip body 15*b* and a connecting bore 56 connecting the first bore 15*d* and the transverse bore 15*e*. The bores 15*d*, 15*e*, 56 ensure that a hydraulic fluid flow from the high pressure compartment 48 to the low pressure compartment 49 is always possible even when the needle valve 12 has elongated due to a high temperature so that the tapered free end 15*c* engages the valve seat 10*d*.

A projection of the tip 15 onto the hypothetical plane α in the normal direction, which coincides with the longitudinal direction 25, is generally annular due to the presence of the connecting bore 56. In other words, the narrowest cross-sectional area is again not fully covered by the tip projection as a central circle is not covered due to the presence of the connecting bore 56. The diameter (or more general the cross-sectional area) of the connecting bore 56 corresponds to the clearance between the tip body 15*b* and the bore section 10*c*1 in the first embodiment shown in FIGS. 1 to 5C.

Although aspects of the present disclosure have been described with respect to specific embodiments, it will be readily appreciated that these aspects may be implemented in other forms within the scope of the invention as defined by the claims.

The invention claimed is:

1. A dashpot for damping a closing movement of a closure system having a support and a closure member that are hingedly connected to each other, the dashpot comprising:

a housing;

a closed cylinder cavity formed within the housing and being filled with hydraulic fluid;

a piston within said housing so as to divide the closed cylinder cavity into a high pressure compartment and a low pressure compartment, the piston being slideable with respect to the housing between two extreme positions in a sliding direction;

a one-way fluid passage provided in the piston and allowing fluid flow from the low pressure compartment to the high pressure compartment when said closure member is being opened;

a first restricted fluid passage provided in the housing and connecting the high pressure compartment and the low pressure compartment and determining a closing speed of the closing movement of the closure system; and a compensation mechanism configured for compensating temperature-induced viscosity changes in said hydraulic fluid, the compensation mechanism comprising:

a second restricted fluid passage provided in the housing connecting the high pressure compartment and the low pressure compartment and having a narrowest cross-sectional area, wherein a location at which the second restricted fluid passage has its narrowest cross-sectional area determines a hypothetical plane, which hypothetical plane has a normal direction; and a needle valve positioned at least partially inside the second restricted fluid passage and comprising:

an elongated body extending between a first end fixed to the housing and a second end opposite the first end, wherein a length of the elongated body is temperature dependent; and a tip positioned at the second end of the elongated body near said location at which the second restricted fluid passage has its narrowest cross-sectional area, wherein a projection of the tip onto said hypothetical plane along said normal direction forms a two-dimensional shape which does not fully cover said narrowest cross-sectional area.

2. The dashpot according to claim 1, wherein the hydraulic fluid has a kinematic viscosity which is variable in a first temperature range and which is stable in a second temperature range.

3. The dashpot according to claim 2, wherein the first temperature range extends between a lower temperature value and a critical temperature value and the second temperature range extends between said critical temperature value and an upper temperature, said critical temperature being comprised between 0° C. and 40° C.

4. The dashpot according to claim 3, wherein said critical temperature is comprised between 10° C. and 30° C.

5. The dashpot according to claim 2, wherein, in said second temperature range, a surface area of the part of the narrowest cross-sectional area that is not covered by the projection stays substantially constant.

6. The dashpot according to claim 1, wherein the needle valve is adjustable to adjust a position of the tip with respect to the narrowest cross-sectional area.

7. The dashpot according to claim 1, wherein the needle valve comprises a base on which the first end of the elongated body is mounted, the base having a threaded outer area which engages a corresponding threaded area of the housing to mount the base on the housing.

8. The dashpot according to claim 1, wherein the hydraulic fluid has a viscosity index of at least 100 determined in accordance with ISO 2909:2002.

9. The dashpot according to claim 1, wherein the elongated body is made of a material having a first coefficient of thermal expansion and the housing is made of a material having a second coefficient of thermal expansion, a difference between the first and second coefficient of thermal expansion being at least 50 μm/m° C.

10. The dashpot according to claim 1, wherein the elongated body extends substantially along said normal direction, the tip comprising a tapered free end and a tip body which fits inside the narrowest cross-sectional area.

11. The dashpot according to claim 10, wherein the tip body is cylindrical with the two-dimensional shape formed by the projection being a circle which is smaller than the narrowest cross-sectional area.

12. The dashpot according to claim 1, wherein the elongated body extends substantially in a direction parallel to said hypothetical plane with the tip being adjacent the narrowest cross-sectional area.

13. The dashpot according to claim 1, wherein the elongated body has a length of at least 20 mm.

14. The dashpot according to claim 1, wherein the elongated body has a length of at least 30 mm.

15. The dashpot according to claim 1, wherein the dashpot comprises a first adjustable needle valve which cooperates with a valve seat formed in the first restricted fluid passage to allow adjusting said closing speed.

16. A hydraulically damped actuator for damping a closing movement of a closure system having a support and a closure member that are hingedly connected to each other, wherein the hydraulically damped actuator comprises a dashpot comprising:

a housing;

a closed cylinder cavity formed within the housing and being filled with hydraulic fluid;

a piston within said housing so as to divide the closed cylinder cavity into a high pressure compartment and a low pressure compartment, the piston being slideable with respect to the housing between two extreme positions in a sliding direction;

a one-way fluid passage provided in the piston and allowing fluid flow from the low pressure compartment to the high pressure compartment when said closure member is being opened;

a first restricted fluid passage provided in the housing and connecting the high pressure compartment and the low pressure compartment and determining a closing speed of the closing movement of the closure system; and a compensation mechanism configured for compensating temperature-induced viscosity changes in said hydraulic fluid, the compensation mechanism comprising:

a second restricted fluid passage provided in the housing and connecting the high pressure compartment and the low pressure compartment and having a narrowest cross-sectional area, wherein a location at which the second restricted fluid passage has its narrowest cross-sectional area determines a hypothetical plane, which hypothetical planes has a normal direction; and a needle valve positioned at least partially inside the second restricted fluid passage and comprising:

an elongated body extending between a first end fixed to the housing and a second end opposite the first end, wherein a length of the elongated body is temperature dependent; and a tip positioned at the second end of the elongated body near said location at which the second restricted fluid passage has its narrowest cross-sectional area, wherein a projection of the tip onto said hypothetical plane along said normal direction forms a two-dimensional shape which does not fully cover said narrowest cross-sectional area.

17. The hydraulically damped actuator according to claim 16, wherein the hydraulic fluid has a kinematic viscosity which is variable in a first temperature range and which is stable in a second temperature range.

18. The hydraulically damped actuator according to claim 17, wherein, in said second temperature range, a surface area of the part of the narrowest cross-sectional area that is not covered by the projection stays substantially constant.

19. The hydraulically damped actuator according to claim 16, wherein the needle valve is adjustable to adjust a position of the tip with respect to the narrowest cross-sectional area.

* * * * *